July 23, 1963

C. B. RICHEY ETAL 3,098,528

TRACTOR HITCHES

Filed Dec. 16, 1960

INVENTORS
CLARENCE B. RICHEY
JOHN F. O'DONNELL
BY

P. F. Hilder

ATTORNEY

July 23, 1963  C. B. RICHEY ETAL  3,098,528
TRACTOR HITCHES
Filed Dec. 16, 1960  3 Sheets-Sheet 2

INVENTORS
CLARENCE B. RICHEY
JOHN F. O'DONNELL
BY
P. F. Hilder
ATTORNEY

United States Patent Office 3,098,528
Patented July 23, 1963

3,098,528
TRACTOR HITCHES
Clarence B. Richey, Royal Oak, and John F. O'Donnell, Rochester, Mich., assignors to Ford Motor Company, Dearborn, Mich., a corporation of Delaware
Filed Dec. 16, 1960, Ser. No. 76,242
6 Claims. (Cl. 172—7)

This invention relates to tractor hitches, and more particularly to hitches for raising or lowering an implement automatically in order to maintain a more or less constant draft on the tractor.

In tractors having hitches of the draft control type, a hydraulic lift is provided for lifting the implement hitch, which usually comprises a pair of lower draft links and a top link forming the well-known "three point" hitch. Admission of fluid to and discharge of fluid from the hydraulic lift is controlled responsive to forces on the links. In the hitch of the present invention, the control operates responsive to the draft or tension in the two lower links of the hitch.

According to the present invention, the two lower links are attached to a transversely extending rocker shaft which has arms pivotally mounted on the tractor rear axle for swinging movement on an axis extending transversely of the tractor. An arm extending from the rocker shaft operates against a spring-biased draft plunger to sense the total draft communicated to the tractor by the lower draft links. This draft sensing is independent of whether there is tension or compression in the top link. Movement of the draft plunger is utilized to operate a valve regulating admission of fluid to and release of fluid from a hydraulic lift cylinder, which in turn raises or lowers the draft links.

Among the objects of the present invention are to provide a tractor hitch of the lower link draft control type which is simple, durable and dependable in operation; which is compact; which accurately measures the total draft in the lower links at all times; and generally to improve tractor hitches of the type described.

Other objects and objects relating to details and economies of manufacture and use will be more apparent from the detailed description to follow.

Our invention is clearly defined in the appended claims. In the claims, as well as in the description, parts may at times be identified by specific means for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

FIGURE 4 is a vertical section of the hitch taken on the line 4—4 of FIGURE 3.

Figure 1:
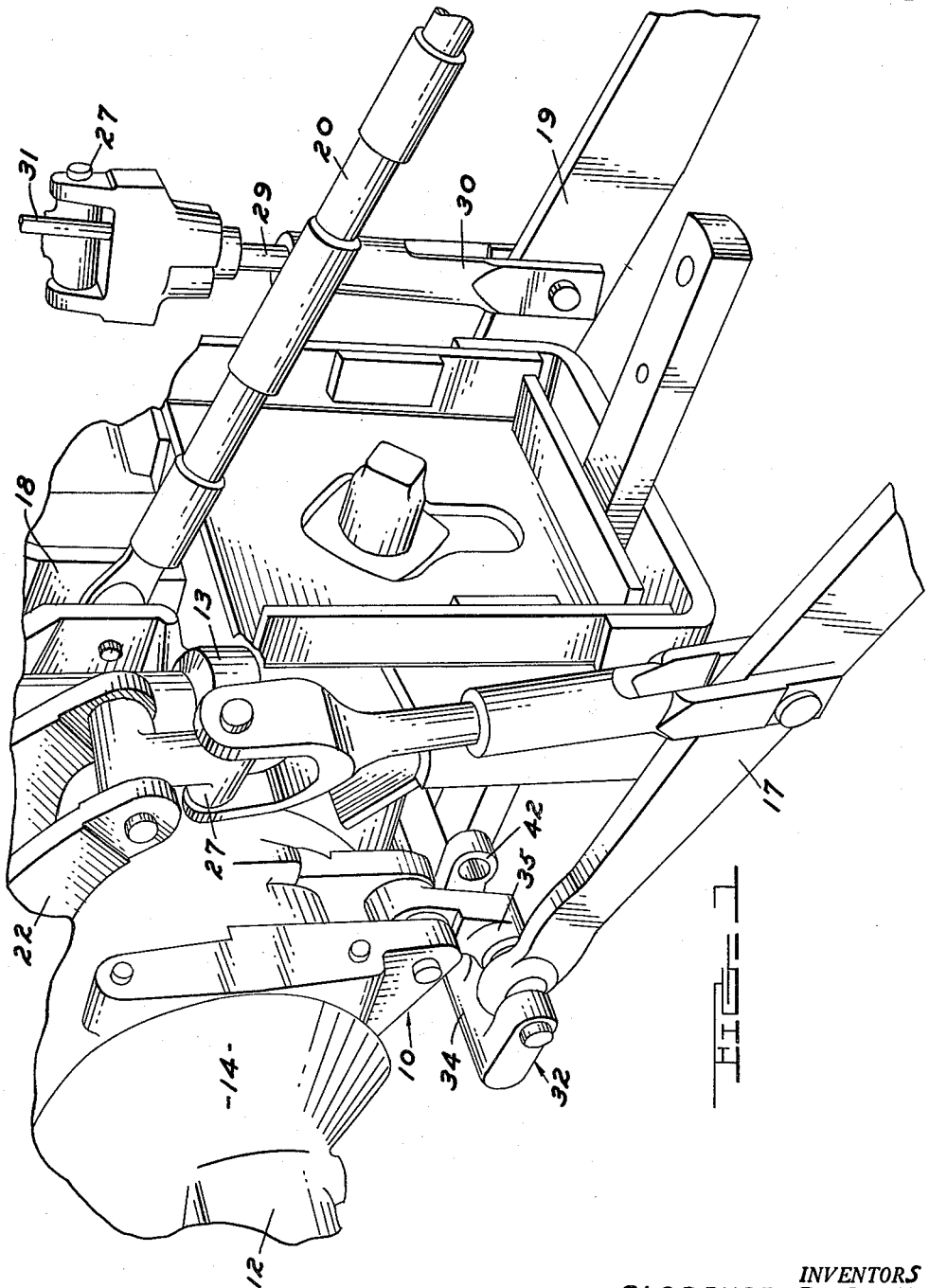
FIGURE 1 is a perspective view of a portion of a tractor including the hitch of the present invention, taken from behind and to the left of the tractor, portions of the tractor hitch being broken away for convenience of illustration.
Figure 2:
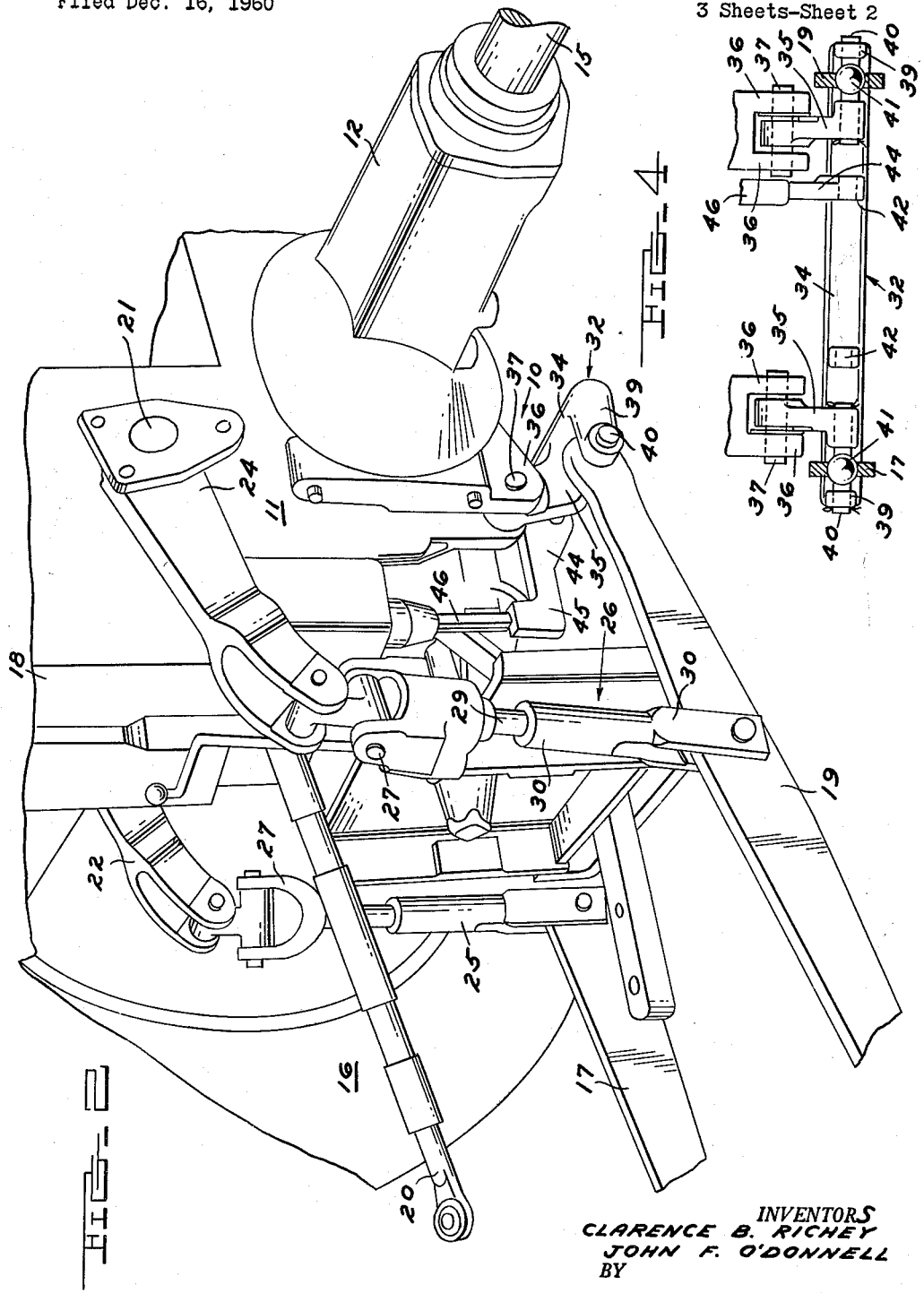
FIGURE 2 is a view similar to FIGURE 1, taken from behind and to the right side of the tractor.

Referring now to the drawings, the tractor in which the present invention is embodied has a rear axle assembly 10 which is formed of a center housing 11 from which rear axle housings 12 and 14 project. A rear axle shaft 15 is received within each housing, and a tractor rear wheel 16 is mounted on the outer end of each shaft.

The tractor is provided with a three-point hitch consisting of two lower draft links 17 and 19 and a top link 20. The forward ends of the draft links 17 and 19 are pivotally connected to the rear axle assembly by a linkage to be described. The forward end of the top link 20 is pivotally connected for a limited universal movement to the rear of a hydraulic lift housing 18 mounted on the rear of and extending along the top of the center housing 11.

The hitch of the present invention is of the power liftable type, in which the lower draft links 17 and 19 may be raised or lowered to regulate the height of an implement in response to draft of the implement in the soil in order to maintain a more or less uniform draft load on the tractor. The hydraulic lift mechanism includes a hydraulic cylinder 13 contained within the lift housing 18 and which actuates a rock shaft 21 extending transversely of the lift housing. A pair of lift arms 22 and 24 are fixed to the outer ends of the rock shaft 21 and a pair of lift links 25 and 26 connect the lift arms 22 and 24 with the lower draft links 17 and 19 respectively intermediate their ends. The left lift link is connected to the lift arm 22 by a universal joint 29 to permit limited universal movement of the draft links. The right lift link 26 is connected to the lift arm 24 by a similar universal joint 27, and, in addition, the length of the right lift link may be adjusted by rotation of a threaded intermediate rod portion 29 of the lift link within the lower clevis portion of the link to permit levelling of an implement carried by the hitch. Adjustment of length of the lift link 26 is accomplished by a crank 31 projecting upwardly adjacent the rear end of the right lift arm.

The draft links 17 and 19 are supported on the tractor by a transversely extending rocker 32 which is supported beneath the rear end of the center housing 11. The rocker 32, which preferably is formed of a relatively heavy forging or casting, consists of a straight bar portion 34 extending transversely of the tractor beneath the center housing 11. The bar portion 34 has a pair of rearwardly and upwardly extending integral arm portions 35, 35, each of which are received between a pair of integral ears 36, 36 projecting downwardly and rearwardly from the inner ends of each of the rear axle housings 12 and 14. A clevis pin 37 extends through each pair of ears 36, 36 and through the arm portions 35 to support the rocker 32 from the tractor for rocking movement about the axis of the pins.

The ends of the rocker 32 are provided with arm portions 39, 39 which extend rearwardly in generally parallel spaced relation to the arm portions 35, 35. The forward ends of the lower draft links 17 and 19 are received between the arm portions 35 and 39 adjacent each end of the rocker 32 and a clevis pin 40 extends through the arm portions and through the customary ball joint 41 at the forward end of each lower draft link. If desired, a second set of arm portions may be spaced inwardly (towards the center) from the arm portions 35, 35 to receive the forward ends of the draft links 17 and 19 on the inside rather than on the outside of the arm portions 35, 35 in order to provide for variable convergence of the lower links to facilitate tractor steering when using certain implements. These arm portions may consist of arm portion 42 on one side and a draft reaction arm, to be described.

A draft reaction arm 45 projects generally horizontally rearwardly from the bar portion 34 of the rocker and terminates in an enlarged end for engaging the lower end of a draft plunger 46 extending from the lower end of the lift housing 18 and mounted for endwise movement therein. A draft reaction spring 47 located within the housing 18 furnishes a reaction which, in operation, is balanced against the force transmitted to the draft plunger 46 due to implement draft on the lower links 17 and 19 of the tractor. The draft plunger is connected by linkage, not shown, but which may be generally similar to that shown in Roeder Patent No. 2,631,514 to a suitable valve for controlling the operation of the hydraulic cylinder 13 of the tractor lift mechanism. If desired, a dust boot 49 formed of flexible material may be provided to enclose the joint between the draft plunger 46 and the lift housing 18 to prevent the entrance of dust.

Figure 3:
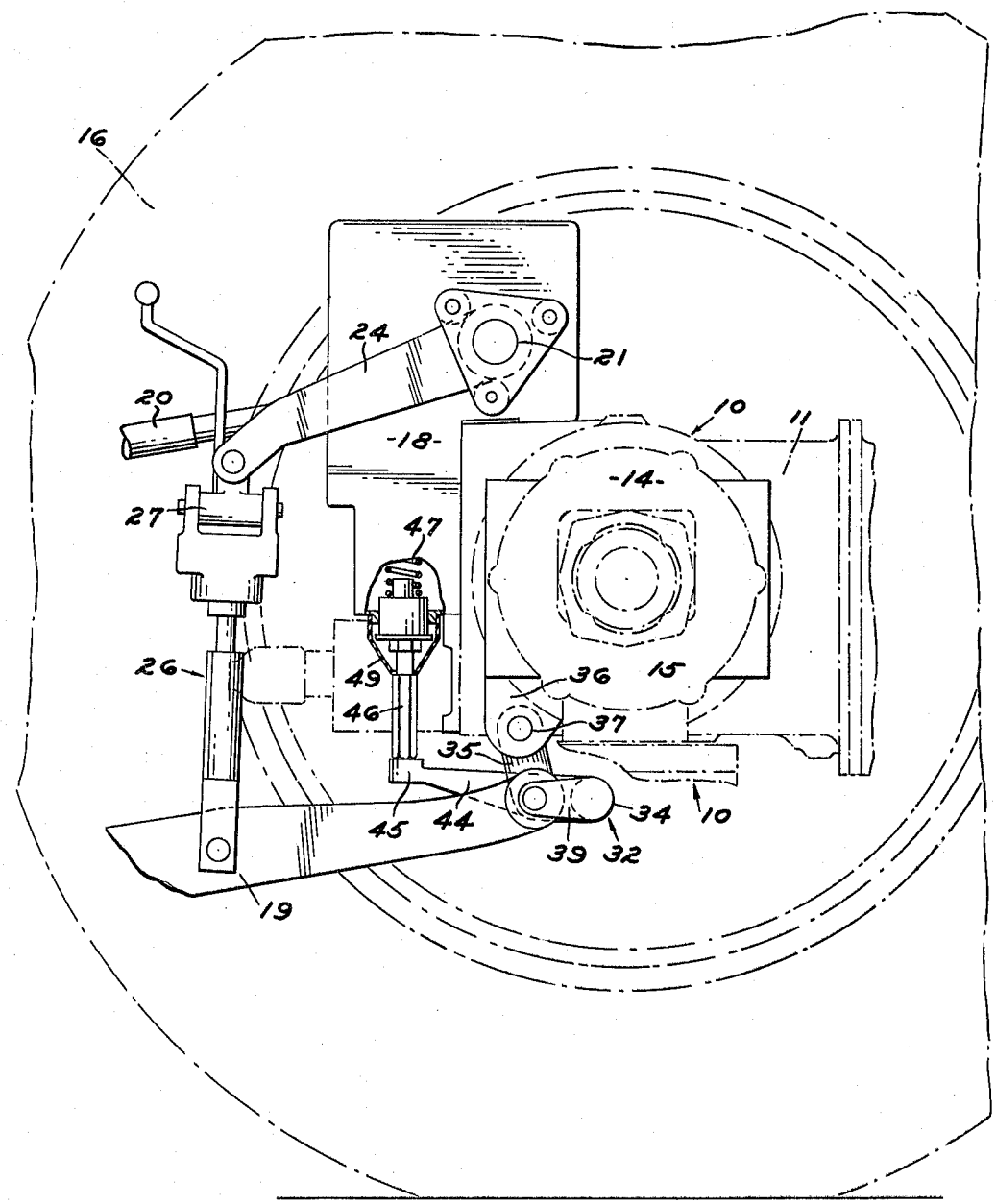
FIGURE 3 is a side elevation of a tractor hitch incorporating the invention, portions of the tractor being shown in broken lines and the tractor hitch and associated parts being shown in full lines.

In use, implement draft produces a rearward force on the draft links 17 and 19 which is transmitted to the rocker 32 and tends to rotate the rocker about the axis of the clevis pins 37, 37 in a clockwise direction as viewed in FIGURE 3. The rocker 32 will be rotated in such direction until the draft reaction arm 44 has compressed draft spring 47 sufficiently to produce a counterlockwise moment on the rocker 32 equal to the clockwise moment which is the sum of the two moments impressed on the rocker by the two draft links. In this manner, a force proportional to the draft communicated to the lower links of the tractor is transmitted to the draft plunger 46, which is operated in a well-known manner to control operation of the hydraulic lift mechanism.

Referring to FIGURE 3, it will be noted that the lift links 25 and 26 are substantially vertical when the draft links 17 and 19 are in ordinary operating position near the lower limit of their travel, shown in full line in FIGURE 3. At the same time, when the lower links 17 and 19 are operated under moderate draft conditions, the clevis pins 40, 40 are in the position indicated in FIGURE 3, in which the clevis pins 40 are slightly in advance of the clevis pins 37. The arrangement is such that, even under maximum draft conditions, the pin 40 always will be in advance of the pin 37 so that, upon draft on the lower links exceeding a set, predetermined amount, the tractor lift cylinder will be operated to raise the lift arms 22 and 24 in a well-known manner in order to raise the draft links 17 and 19 and thus raise the implement. This correcting of the draft or raising, however, likewise will tend to raise the forward ends of the draft links 17 and 19 and inasmuch as the pin 40 is in advance of the pin 37 and the lift links exerting the raising force are substantially vertical, a counterclockwise moment will be impressed on the rocker 32 as viewed in FIGURE 3 so as to cut off the signal of excessive draft and thus curtail the lift, thus preventing "hunting" of the hydraulic system, contribute to stability of the implement and tend to reduce the number of draft correction per minute.

We claim:

1. In a tractor having a rear axle assembly including a center housing, a pair of liftable lower draft links and a hydraulic lift mechanism for lifting the draft links; a unitary rocker shaft extending transversely of the tractor beneath the center housing and having a pair of spaced arms pivotally mounted on the rear axle assembly for fore and aft swinging movement of the rocker shaft on an axis extending transversely of the tractor through the center housing, the lower draft links having their forward ends pivotally connected to the rocker shaft on an axis parallel to and offset from the transversely extending axis, and the rocker shaft having a third arm projecting rearwardly therefrom, and means displaceable by said third arm for controlling operation of the hydraulic lift mechanism.

2. In a tractor having a rear axle assembly including a center housing, a pair of liftable lower draft links and a hydraulic lift mechanism for lifting the draft links; a unitary rocker shaft extending transversely of the tractor beneath the center housing and having a pair of spaced, upwardly projecting arms pivotally mounted on the rear axle assembly for fore and aft swinging movement of the rocker shaft on an axis extending transversely of the tractor through the center housing, the lower draft links having their forward ends pivotally connected to the rocker shaft on an axis parallel to and offset downwardly from the transversely extending axis, and the rocker shaft having a third arm projecting rearwardly therefrom and means displaceable by said third arm for controlling operation of the hydraulic lift mechanism.

3. In a tractor having a rear axle assembly including a center housing and a pair of rear axle housings extending laterally from opposite sides thereof, a pair of liftable lower draft links and a hydraulic lift mechanism for lifting the draft links, the improvement which comprises: the hydraulic lift mechanism comprising a unitary body secured to the top and rear surfaces of the center housing, a hydraulic lift cylinder within the body to the rear of the center housing, a draft control spring and plunger within the body to the rear of the center housing and beside the lift cylinder, the spring extending between the plunger and body and axially biasing the plunger, a rock shaft journalled in the body above the rear axle housing, piston means in the hydraulic lift cylinder and operatively connected with the rock shaft a pair of lift arms extending rearwardly from the ends of the rock shaft, a pair of lift links connecting the rear ends of the lift arms with intermediate portions of the draft links, and a rocker shaft extending transversely of the tractor and pivotally mounted beneath the rear axle assembly for swinging movement about an axis extending transversely of the tractor, the rocker shaft having portions located below said axis for receiving the forward ends of the lower draft links and having a rearwardly extending arm engaging the lower end of the draft plunger to transmit thereto an axial force responsive to the draft on the lower draft links and opposing the bias of the plunger.

4. In a tractor having a rear axle assembly including a center housing and a pair of rear axle housings extending laterally from opposite sides thereof, a pair of liftable lower draft links and a hydraulic lift mechanism for lifting the draft links, the improvement which comprises: the hydraulic lift mechanism comprising a unitary body secured to the top and rear surfaces of the center housing, a hydraulic lift cylinder within the body to the rear of the center housing a draft control spring and plunger within the body to the rear of the center housing and beside the lift cylinder, the spring extending between the plunger and body and axially biasing the plunger, a rock shaft journalled in the body above the rear axle housing and having a pair of lift arms mounted thereon, piston means in the hydraulic lift cylinder and operatively connected with the rock shaft, a pair of lift links connecting the rear ends of the lift arms with intermediate portions of the draft links, and a rocker shaft extending transversely of the tractor and having a pair of upwardly projecting arms pivotally mounted on the lower portion of the rear axle assembly for swinging movement about an axis extending transversely of the tractor, the rocker shaft having portions located below the pivotal mounting on the rear axle assembly pivotally receiving the forward ends of the lower draft links, and a rearwardly extending arm engaging the lower end of the draft plunger.

5. In a tractor having a rear axle assembly including a center housing, a pair of liftable lower draft links and a hydraulic lift mechanism for lifting the draft links; a unitary rocker shaft comprising a straight bar extending transversely of the tractor beneath the center housing and having a first pair of integral arms located one adjacent each end of the bar and extending rearwardly and upwardly and having their upper ends pivotally mounted on the underside of the rear axle assembly for fore and aft swinging movement of the rocker shaft on an axis extending transversely of the tractor through the center housing, a second pair of integral arms extending rearwardly from the bar with each arm in spaced relation to one of the arms of the first pair, a pin extending through each set of spaced arms and through the forward end of one of the draft links for pivotally connecting the draft links to the rocker, a third arm projecting rearwardly from the bar, and means displaceable by said third arm for controlling operation of the hydraulic lift mechanism.

6. In a tractor having a rear axle assembly including a center housing, a pair of liftable lower draft links and a hydraulic lift mechanism for lifting the draft links; a unitary rocker shaft comprising a straight bar extending transversely of the tractor beneath the center housing and having a first pair of integral arms located one adjacent each end of the bar and extending rearwardly and upwardly and having their upper ends pivotally mounted on the underside of the rear axle assembly for fore and aft swinging movement of the rocker shaft on an axis extending transversely of the tractor through the center housing, a second pair of integral arms extending rearwardly from the bar with each arm in spaced relation to one of the arms of the first pair, a pin received by each set of spaced arms and extending through the forward end of one of the draft links for pivotally connecting the draft links to the rocker, a third arm projecting from the bar, and means displaceable by said third arm for controlling operation of the hydraulic lift mechanism.

References Cited in the file of this patent

UNITED STATES PATENTS

| | | |
|---|---|---|
| 2,714,346 | Valin | Aug. 2, 1955 |
| 2,754,742 | Altgelt | July 17, 1956 |
| 2,804,005 | Lee | Aug. 27, 1957 |
| 2,914,125 | Tanke et al. | Nov. 24, 1959 |
| 2,996,125 | Bunting | Aug. 15, 1961 |

FOREIGN PATENTS

| | | |
|---|---|---|
| 1,134,610 | France | Dec. 3, 1956 |